(12) United States Patent
Iwase

(10) Patent No.: US 9,577,294 B2
(45) Date of Patent: Feb. 21, 2017

(54) MANUFACTURING METHOD FOR SECONDARY BATTERY

(71) Applicant: TOYOTA JIDOSHA KABUSHIKI KAISHA, Toyota-shi, Aichi-ken (JP)

(72) Inventor: Kosuke Iwase, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 192 days.

(21) Appl. No.: 14/499,357

(22) Filed: Sep. 29, 2014

(65) Prior Publication Data

US 2015/0091578 A1  Apr. 2, 2015

(30) Foreign Application Priority Data

Oct. 2, 2013 (JP) ................. 2013-207123

(51) Int. Cl.
    *G01N 27/416* (2006.01)
    *H01M 10/48* (2006.01)
    *H01M 10/04* (2006.01)
    *H01M 10/42* (2006.01)

(52) U.S. Cl.
    CPC ......... *H01M 10/48* (2013.01); *H01M 10/0413* (2013.01); *H01M 10/0481* (2013.01); *H01M 10/42* (2013.01)

(58) Field of Classification Search
    CPC .................................................. H01M 10/48

USPC ......................................................... 324/430
See application file for complete search history.

(56) References Cited

FOREIGN PATENT DOCUMENTS

| JP | 2002-352864 | | 12/2002 | |
|----|-------------|---|---------|---|
| JP | 2010-32346  |   | 2/2010  |   |
| JP | 2010-153275 | * | 7/2010  | ............ H01M 10/04 |
| JP | 2011-69775  |   | 4/2011  |   |

* cited by examiner

*Primary Examiner* — Edward Tso
*Assistant Examiner* — Ahmed Omar
(74) *Attorney, Agent, or Firm* — Finnegan, Henderson, Farabow, Garrett & Dunner, LLP

(57) ABSTRACT

A method of manufacturing for a secondary battery. The secondary battery is configured to include an electrode group in a battery package. The electrode group includes a positive electrode, a negative electrode, and a separator. The manufacturing method includes: (a) measuring a first voltage drop amount of the secondary battery with the passage of time in a state in which a compression force in a direction parallel to a lamination direction of the electrode group is applied to the electrode group via the battery package; (b) measuring a second voltage drop amount of the secondary battery with the passage of time in a state in which the compression force is released; and (c) detecting a small short circuit of the secondary battery by comparing the first voltage drop amount and the second voltage drop amount.

4 Claims, 3 Drawing Sheets

MANUFACTURING METHOD FOR SECONDARY BATTERY

INCORPORATION BY REFERENCE

The disclosure of Japanese Patent Application No. 2013-207123 filed on Oct. 2, 2013 including the specification, drawings and abstract is incorporated herein by reference in its entirety.

BACKGROUND OF THE INVENTION

1. Field of the Invention

The invention relates to a manufacturing method for a secondary battery.

2. Description of Related Art

Currently, secondary batteries which can be recharged and repeatedly used are widely used. A process of manufacturing such secondary batteries includes an inspection process for detecting a defective battery (for example, Japanese Patent Application Publication No. 2002-352864 (JP 2002-352864 A)).

In general, a secondary battery has, as a base element, an electrode group including a positive electrode, a negative electrode, and a separator. In the electrode group, the positive electrode and the negative electrode are completely separated from each other by the separator so as not to be in electrical contact with each other. However, in some cases, foreign matter is mixed in the electrode group due to various reasons in the secondary battery manufacturing process, and the positive electrode and the negative electrode come in contact with each other via the foreign matter. Such a phenomenon is called a small short circuit and causes various performance degradations such as a reduction in capacity.

When foreign matter is mixed in the electrode group, a reduction in performance may occur even when the reduction in performance is not exhibited at the beginning of use. The reason for an occurrence of such an event can be thought of as follows. For example, when foreign matter is present on the electrode, a part in which the distance between the electrodes is small is locally generated due to the foreign matter. In such a part, a current is easily collected upon charging and discharging, and thus when charging and discharging are repeated, a short circuit path is gradually formed and reaches a small short circuit. That is, it can be said that a secondary battery having foreign matter mixed therein includes a small short circuit.

Accordingly, the secondary battery having foreign matter mixed therein should be eliminated as a defective product. However, in many cases, even when foreign matter is mixed in the electrode group, a short circuit which affects battery characteristics is not reached immediately after the completion of the secondary battery. Accordingly, the short circuit is not easily detected by an initial capacity inspection or voltage inspection.

Various methods have been proposed to detect the small short circuit. For example, JP 2002 352864 A discloses a method of detecting a small short circuit by performing charging and discharging of a secondary battery under a predetermined condition and by then measuring a change in battery voltage during leaving.

SUMMARY OF THE INVENTION

In recent years, secondary batteries have also been used as a power source for a vehicle. Secondary batteries for a vehicle are required to have high reliability over a long period of time. That is, it is necessary to eliminate smaller short circuit factors than in conventional cases.

The small short circuit can be detected using the method disclosed in JP 2002 352864 A, but there is a problem in that the inspection requires a long period of time. In addition, in this method, it is difficult to detect the mixing of foreign matter which does not reach the small short circuit during the inspection.

When a normal secondary battery is left after charging, the voltage thereof is gradually dropped due to self-discharge. The smaller the foreign matter, the smaller the difference in voltage change between the secondary battery having foreign matter mixed therein and the normal secondary battery, and thus it is very difficult to distinguish between the normal secondary battery and the secondary battery having foreign matter mixed therein.

In view of the above-described problems, an object of the invention is to provide a manufacturing method for a secondary battery to detect a small short circuit with high accuracy and to manufacture a secondary battery having high reliability.

An aspect of the invention is a method of manufacturing for a secondary battery. The secondary battery is configured to include an electrode group in a battery package. The electrode group includes a positive electrode, a negative electrode, and a separator. The manufacturing method includes: (a) measuring a first voltage drop amount of the secondary battery with the passage of time in a state in which a compression force in a direction parallel to a lamination direction of the electrode group is applied to the electrode group via the battery package; (b) measuring a second voltage drop amount of the secondary battery with the passage of time in a state in which the compression force is released; and (c) detecting a small short circuit of the secondary battery by comparing the first voltage drop amount and the second voltage drop amount.

The separator of the secondary battery functions to prevent the positive electrode and the negative electrode from being in electrical contact with each other and to hold an electrolyte (electrolytic solution). Therefore, the separator has many gaps therein and has high flexibility. Accordingly, when a compression force is applied to the electrode group as in the above-described (a), the compression force is mainly absorbed by elastic deformation of the separator. Thus, the distance between the positive and negative electrodes is reduced. Therefore, in a secondary battery including foreign matter between the electrodes, the first voltage drop amount $\Delta V1$ (hereinafter, referred to as voltage drop amount $\Delta V1$) is larger than in a normal secondary battery. That is, in the above-described (a), a small short circuit is forcibly caused in the battery including foreign matter between the electrodes.

The aspect includes the above-described (b) measuring a second voltage drop amount $\Delta V2$ (hereinafter, referred to as voltage drop amount $\Delta V2$) of the secondary battery with the passage of time in a state in which the compression force is released after the above-described (a). In the above-described (b), the thickness of the separator returns to almost its original value by releasing the compression force, and thus a short circuit occurring by foreign matter is eliminated. When the voltage drop amount $\Delta V2$ is measured in this state, the voltage drop amount in a secondary battery including foreign matter between the electrodes is smaller than in a normal secondary battery. The reason for this is that in the secondary battery including foreign matter, a larger amount of energy is consumed in the first step than in the normal secondary battery, and an electrochemical potential which becomes a driving force of self-discharge is reduced.

The aspect further includes the above-described (c) detecting a small short circuit by comparing the voltage drop amount $\Delta V1$ and the voltage drop amount $\Delta V2$. As described above, the voltage drop amount $\Delta V1$ and the voltage drop amount $\Delta V2$ in a secondary battery having foreign matter mixed therein reflect characteristics distinguishable from those of a normal secondary battery. Accordingly, using the voltage drop amount $\Delta V1$ and the voltage drop amount $\Delta V2$ in combination, a secondary battery having foreign matter mixed therein can be detected with higher accuracy than in conventional cases. That is, according to the manufacturing method for a secondary battery of the invention, it is possible to manufacture a secondary battery having high reliability.

In the aspect, in the detecting a small short circuit, determination that the small short circuit occurs may be made, when a value obtained by dividing the first voltage drop amount by the second voltage drop amount is larger than a predetermined value. In the aspect, when the determination is made, a determination that the secondary battery is a defective product may be made.

As described above, according to the aspect of the invention, in a secondary battery having foreign matter mixed therein, the voltage drop amount $\Delta V1$ is larger and the voltage drop amount $\Delta V2$ is smaller than in a normal secondary battery. Accordingly, a value obtained by dividing the voltage drop amount $\Delta V1$ by the voltage drop amount $\Delta V2$ (hereinafter, referred to as $\Delta V1/\Delta V2$) in a secondary battery having foreign matter mixed therein is a significantly large value. Thus, it is possible to easily determine the quality of the secondary battery. In addition, since $\Delta V1/\Delta V2$ is very effective as a standard for determining a defective secondary battery, an appropriate reference value can be easily set.

Another aspect of the invention is a manufacturing method for a secondary battery. The secondary battery is configured to include an electrode group including a positive electrode, a negative electrode, and a separator. The electrode group including a thickness of the separator when the separator is compressed with a pressure of 50 MPa being 70% or less of a thickness of the separator before the compression. The manufacturing method includes: (a) measuring a first voltage drop amount of the secondary battery with the passage of time in a state in which a compression force in a direction parallel to a lamination direction of the electrode group is applied to the electrode group via the battery package; (b) measuring a second voltage drop amount of the secondary battery with the passage of time in a state in which the compression force is released; and (c) detecting a small short circuit of the secondary battery by comparing the first voltage drop amount and the second voltage drop amount.

Using such a separator, the differences in the voltage drop amount $\Delta V1$, in the voltage drop amount $\Delta V2$, and in $\Delta V1/\Delta V2$ between a secondary battery having foreign matter mixed therein and a normal secondary battery are made more obvious. Accordingly, it is possible to further increase the accuracy of detection of the defective product.

According to the manufacturing method for a secondary battery of the invention, a small short circuit can be detected with high accuracy, and thus a secondary battery having high reliability can be manufactured.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
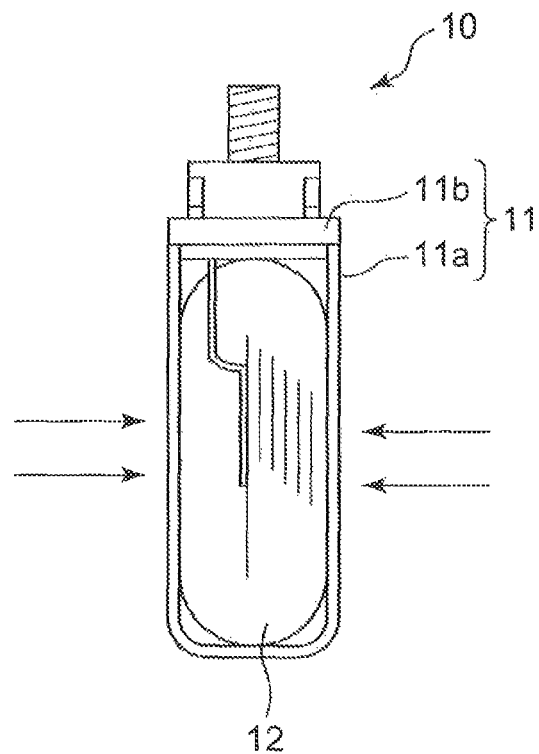
FIG. 1 is a schematic cross-sectional view illustrating a secondary battery according to an embodiment of the invention.

Hereinafter, embodiments of the invention (hereinafter, referred to as "this embodiment") will be described in detail, but the invention is not limited thereto.

The inventors of the invention have conducted an intensive study to solve the problems, and as a result, obtained the following novel knowledge. When a voltage drop amount $\Delta V1$ of a secondary battery is measured in a state in which the outside of the secondary battery having foreign matter mixed therein is bound, the measured $\Delta V1$ is larger than that in a normal secondary battery. Thereafter, when a voltage drop amount $\Delta V2$ of the secondary battery is measured in a state in which the binding of the secondary battery is released, $\Delta V2$ is smaller than that in a normal secondary battery. The inventors of the invention have conducted a further intensive study based on the above-described knowledge, and completed the invention.

That is, a manufacturing method of this embodiment is a manufacturing method for a secondary battery, and includes an inspection process for detecting a small short circuit of the secondary battery. The secondary battery includes an electrode group in a battery package and the electrode group has a positive electrode, a negative electrode, and a separator.

The inspection process includes the following first, second, and third processes. In the first process, a voltage drop amount $\Delta V1$ of the secondary battery with the passage of time is measured in a state in which a compression force in a direction parallel to a lamination direction of the electrode group is applied to the electrode group via the battery package. In the second process, a voltage drop amount $\Delta V2$ of the secondary battery with the passage of time is measured in a state in which the compression force is released. In the third process, a small short circuit is detected by comparing the voltage drop amounts $\Delta V1$ and $\Delta V2$.

In this embodiment, the voltage drop amounts $\Delta V1$ and $\Delta V2$ are used as a standard for determining a defective product, and thus a secondary battery having foreign matter mixed therein can be detected with high accuracy.

In the following description, the expression "a secondary battery having foreign matter mixed therein" may be simply referred to as "defective product", and the expression "a normal secondary battery" may be simply referred to as "non-defective product". The voltage drop amount $\Delta V1$ may be simply referred to as "$\Delta V1$", and the voltage drop amount $\Delta V2$ may be simply referred to as "$\Delta V2$".

The manufacturing method of this embodiment may include other arbitrary processes related to the manufacturing of the battery so long as the inspection process is included. For example, an electrode preparation process, an electrode group preparation process, a process of inserting the electrode group into the battery package, a liquid injection process, a sealing process, a charging and discharging inspection process, and the like which have been hitherto known may be included.

A secondary battery according to this embodiment will be described. The secondary battery according to this embodiment may be a rechargeable battery, and the battery system is not particularly limited. For example, the secondary battery may be a lithium ion secondary battery or a nickel hydrogen battery. The battery shape is also not particularly limited, and thus the secondary battery may have a flat shape, a cylindrical shape, or the like. However, the battery shape is preferably a flat shape from the viewpoint of easily applying a compression force to an electrode group.

FIG. 1 is a schematic cross-sectional view illustrating an example of the secondary battery according to this embodiment. A secondary battery 10 illustrated in FIG. 1 is provided with a battery package 11 and an electrode group 12. The electrode group 12 has a positive electrode, a negative electrode, and a separator, and is contained in the battery package 11.

The battery package 11 is formed of a case-shaped main body portion 11a and a lid portion 11b. The main body portion 11a and the lid portion 11b are bonded to each other using predetermined means such as laser welding. Typically, the material of the battery package 11 is a metal such as an aluminum alloy. A laminate-type (also called a pouch-type) package other than the configuration illustrated in FIG. 1 may also be employed as the battery package 11.

The electrode group 12 is a winding-type electrode group having a positive electrode, a negative electrode, and a separator. For example, such a winding-type electrode group can be prepared by winding so that the positive electrode and the negative electrode both having a sheet shape are opposed to each other with the separator interposed therebetween. In this embodiment, the electrode group is not limited to the winding-type electrode group, and may be, for example, a stack-type electrode group configured by laminating a positive electrode, a separator, and a negative electrode.

Such a secondary battery can be obtained through a known manufacturing method as described above. By subjecting the secondary battery to the inspection process of this embodiment, defective products are securely detected and eliminated, and thus it is possible to increase the reliability of the secondary battery.

Figure 6:
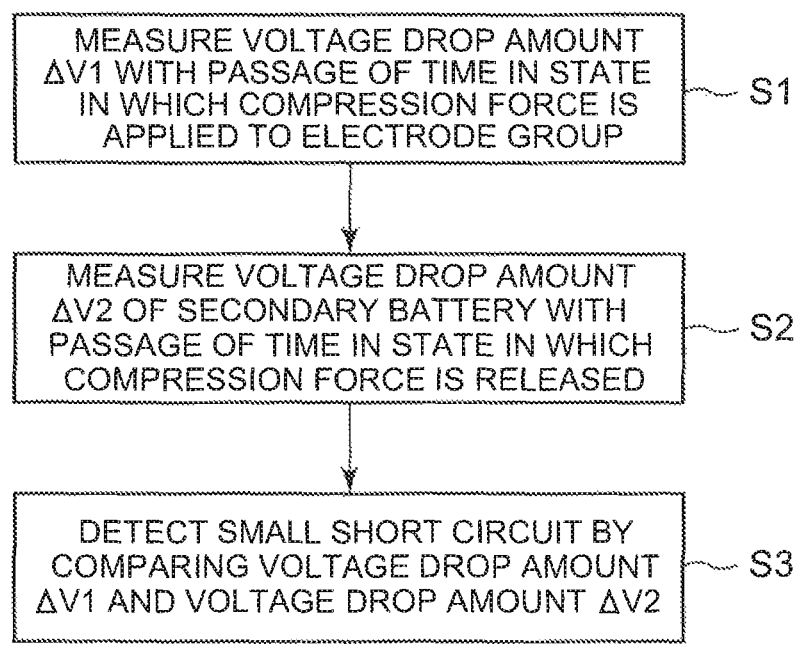
FIG. 6 is a schematic flowchart illustrating an inspection process according to the embodiment of the invention.

FIG. 6 is a schematic flowchart illustrating the inspection process of this embodiment. As illustrated in FIG. 6, the inspection process of this embodiment includes the first process (S1), the second process (S2), and the third process (S3). Hereinafter, the respective processes included in the inspection process will be described.

The first process is a process of measuring a voltage drop amount $\Delta V1$ of the secondary battery 10 with the passage of time in a state in which a compression force in a direction parallel to a lamination direction of the electrode group 12 is applied to the electrode group 12 via the battery package 11.

In the first process, a compression force in a direction parallel to the lamination direction of the electrode group 12 is applied to the electrode group 12 to compress the separator, and thus in a secondary battery 10 having foreign matter mixed therein, a small short circuit occurs via the foreign matter, Therefore, $\Delta V1$ in a defective product is larger than in a non-defective product, Here, the expression a direction parallel to the lamination direction of the electrode group 12" is, for example, a direction of the arrows in FIG. 1.

In the measurement of $\Delta V1$, the secondary battery 10 is charged with a predetermined amount of a current. At this time, the charging can be performed so that for example, the state of charge (SOC) is approximately 80% to 100% at a current value of approximately 0.2 It to 3.0 It. Here, the SOC is preferably 90% to 100% from the viewpoint of increasing the inspection accuracy. The reason for this is that in some cases, a variation in the voltage drop amount increases when the secondary battery is left in a state in which the SOC is low. The symbol "It" indicates a current value at which the rated capacity of the battery is discharged for one hour.

The method of applying a compression force in a direction parallel to the lamination direction of the electrode group 12 to the electrode group 12 via the battery package 11 is not particularly limited. In the case of a flat battery as illustrated in FIG. 1, for example, a pressing device 20 illustrated in FIG. 2 can be preferably used.

Figure 2:
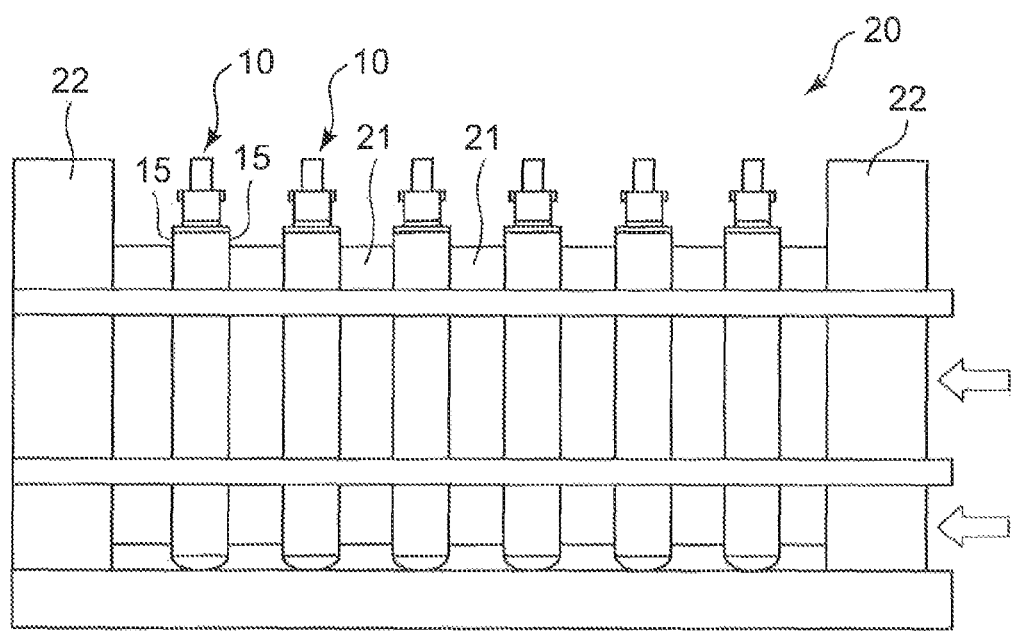
FIG. 2 is a schematic diagram illustrating a pressing device according to the embodiment of the invention.

FIG. 2 is a schematic diagram illustrating the pressing device according to this embodiment. The pressing device 20 illustrated in FIG. 2 is configured to simultaneously bind a plurality of secondary batteries 10 and to press side surfaces 15 of the plurality of secondary batteries 10. The pressing device 20 presses the side surfaces 15 of the secondary batteries 10 to apply a compression force in a direction parallel to the lamination direction of the electrode group 12 to the electrode group 12 via the battery package 11. Here, the expression "bind the secondary batteries" indicates at least one of "pressing of the secondary batteries" and "application of a compression force to the electrode group".

A pressure plate 21 is preferably interposed between the secondary batteries 10 so that the secondary batteries 10 are not in direct contact with each other. The pressure plate 21 is, for example, a plate-shaped member made of a synthetic resin having a high mechanical strength. A surface to be pressed in the side surface 15 of the secondary battery 10 can be adjusted according to the size (area) of the pressure plate 21. In order to efficiently apply a compression force to the electrode group 12, the surface to be pressed is preferably adjusted so as to be larger than a planar surface portion of the electrode group 12 and so as to be on the inner side than an end portion of the battery package 11 (for example, in FIG. 1, a bonding portion between the main body portion 11a and the lid portion 11b or a bent portion of the main body portion 11a).

In the pressing device 20, binding plates 22 are moved in a direction of the arrows in FIG. 2 to apply a uniform pressing force to each of the plurality of secondary batteries 10 interposed between the pair of binding plates 22. Here, although dependent on the material of the package, the pressing force which is applied to the secondary battery 10 is preferably 0.1 MPa to 5 MPa, more preferably 0.5 MPa to 2.5 MPa, and even more preferably 0.5 MPa to 1.5 MPa, and is, for example, approximately 1 MPa. The reason for this is that by applying a pressing force in this range, a compression force can be applied to the electrode group 12 without excessively deforming (damaging) the battery package 11 and the electrode group 12.

The thickness of the separator of the secondary battery 10 according to this embodiment when the separator is compressed with a pressure of 50 MPa is preferably 70% or less of the thickness before the compression. The inventors of the invention have investigated a causal relationship between the reliability of the battery and the mixing of foreign matter, and obtained the following knowledge. For example, in order to secure long-term reliability which is required for a battery for a vehicle, elimination of the mixing of foreign matter having a diameter of approximately 100 μm to 200 μm in the electrode group 12 is effective. The inventors of the invention have conducted an examination based on the knowledge, and found the fact that in a state in which foreign matter having such a size is present between the electrodes, when a pressure of approximately 1 MPa is applied to the secondary battery 10, a pressure of approximately 50 MPa is applied around the foreign matter. Furthermore, during the same examination, the inventors of the invention have confirmed that when the thickness of the separator is locally 70% or less, the voltage drop amount increases due to a small short circuit.

Accordingly, using a separator in which the thickness when the separator is compressed with a pressure of 50 MPa is 70% or less of the thickness before the compression, it is possible to further increase the accuracy of detection of the small foreign matter. From the viewpoint of increasing the difference in the voltage drop amount $\Delta V1$ between a non-defective product and a defective product, the thickness when the separator is compressed with a pressure of 50 MPa is preferably 10% to 70%, more preferably 20% to 60%, and even more preferably 30% to 50% of the thickness before the compression. The thickness of the separator of this embodiment is more preferably restored up to 80% to 100% of the thickness before the compression when the pressure is released.

The thickness of the separator when the separator is compressed with a pressure of 50 MPa can be measured using a compression test device capable of measuring a relationship between a load and compressive displacement while adding the load to a sample. Examples of such a device include a precision universal testing machine "Autograph" manufactured by Shimadzu Corporation.

The material of the separator is not particularly limited. For example, a microporous film or nonwoven fabric made of polypropylene or polyethylene can be used. The thickness of the separator is also not particularly limited. The thickness is, for example, approximately 5 μm to 50 μm, and preferably approximately 10 μm to 35 μm. A hole diameter and a porosity of the separator may be appropriately changed according to the specification of the secondary battery.

In the first process, a period of time during which the voltage drop amount $\Delta V1$ with the passage of time is measured is preferably 0.5 days (12 hours) or longer, and more preferably 1.0 day (24 hours) or longer. In general, the secondary battery 10 requires a certain amount of time until the entire charging state of the electrode is uniformized after charging. During this period of time, there is a tendency that the voltage of the secondary battery 10 easily fluctuates. Therefore, when the period of time during which the voltage drop amount is measured is short, the measured value includes the voltage fluctuation immediately after charging, and thus the reliability of the measured value may be reduced. When the measurement time of the first process is 12 hours or longer as described above, the measured value is expected to have sufficient reliability.

The temperature conditions in the first process are not particularly limited. For example, the first process may be performed at room temperature (25° C.), or under a constant temperature environment of 40° C. to 70° C. to increase $\Delta V1$. In addition, the first process may be performed under a constant temperature environment of −10° C. to 10° C. When the secondary battery 10 is left under such a low temperature environment, $\Delta V1$ is reduced, but the difference in $\Delta V1$ between a non-defective product and a defective product is increased, and thus detection accuracy may be increased.

The inspection process of this embodiment includes the second process after the first process. The second process is a process of measuring a voltage drop amount $\Delta V2$ of the secondary battery with the passage of time in a state in which the compression force is released. Here, the expression "the compression force is released" indicates at least one of "release of binding of the secondary battery" and "weakening the pressing force to the secondary battery".

In the second process, the compression force is released, and thus a small short circuit due to foreign matter is eliminated in a defective product. In the first process, since the defective product consumes a larger amount of energy than a non-defective product, $\Delta V2$ of the defective product in the second process is smaller than that of the non-defective product. Using this phenomenon, the quality of a secondary battery is determined in the inspection process of this embodiment.

By executing the second process after the first process, it is possible to detect, for example, a secondary battery which becomes a defective product later due to unrestorable deformation of the electrode group 12 in the first process.

In the second process, a period of time during which the voltage drop amount $\Delta V2$ with the passage of time is measured is preferably 0.5 days (12 hours) or longer, and more preferably 1.0 day (24 hours) or longer as in the first process. The reason for this is that when the state in which the pressing force is applied shifts into a state in which the pressing force is released, the secondary battery also requires a certain amount of time until the voltage is stabilized. In addition, the temperature conditions in the second process are also not particularly limited. For example, the same conditions as those of the first process can be employed.

In the third process of this embodiment, the voltage drop amounts $\Delta V1$ and $\Delta V2$ obtained in the first and second processes, respectively, are compared to detect a small short circuit and the quality of a secondary battery is determined. $\Delta V1$ and $\Delta V2$ of a non-defective product fluctuate in an inspection lot and between inspection lots. Accordingly, when the quality of a secondary battery is determined using any one of $\Delta V1$ and $\Delta V2$, the non-defective product may be eliminated as a defective product. In this embodiment, these two are used in combination as a standard for determining a defective product, and thus inspection accuracy can be increased compared to conventional cases.

Specifically, for example, a secondary battery can be determined as a defective product (that is, there is a small short circuit) when a value ($\Delta V1/\Delta V2$) obtained by dividing $\Delta V1$ by $\Delta V2$ is larger than a predetermined value. As described above, in this embodiment, in a defective product, $\Delta V1$ is larger and $\Delta V2$ is smaller than in a non-defective product. Accordingly, $\Delta V1/\Delta V2$ in a defective product is a significantly larger value than in a non-defective product. Thus, it is possible to securely distinguish between a non-defective product and a defective product.

More specifically, for example, a secondary battery is preferably determined as a defective product when $\Delta V1/\Delta V2$ is 10.0 or larger. According to the examination of the inventors of the invention, it is possible to securely eliminate a defective product with high accuracy by employing such a standard for determining a defective product.

Hereinafter, the invention will be described in further detail using examples, but is not limited thereto.

First, flat lithium ion secondary batteries Nos. 1 to 10 were prepared using a known manufacturing method. Next, flat lithium ion secondary batteries Nos. 11 and 12 were prepared in the same manner as Nos. 1 to 10, except that small foreign matter (metallic piece having a diameter of approximately 100 μm) was intentionally mixed in an electrode group 12. The lithium ion secondary batteries Nos. 1 to 12 have the configuration illustrated in FIG. 1.

A separator formed of a microporous film made of polypropylene having an initial thickness of 20 μm was used in the lithium ion secondary batteries Nos. 1 to 12. When the thickness of this separator upon compression was measured using a precision universal testing machine "Autograph" manufactured by Shimadzu Corporation, the thickness when the separator was compressed with a pressure of 50 MPa was 14 μm (that is, 70% of the thickness before the compression). In this separator, when the thickness was measured again after release of the pressure of 50 MPa and leaving for one hour, the thickness of the separator was 19 μm, and the thickness was restored up to 95% compared to the thickness before the compression.

The first process will be described. First, each battery was discharged up to SOC 0% at a current value of 0.33 It. Next, each battery was charged up to SOC 90% at a current value of 0.5 It. After leaving for two hours at room temperature, an initial voltage $V_0$ of each battery was measured.

Figure 3:
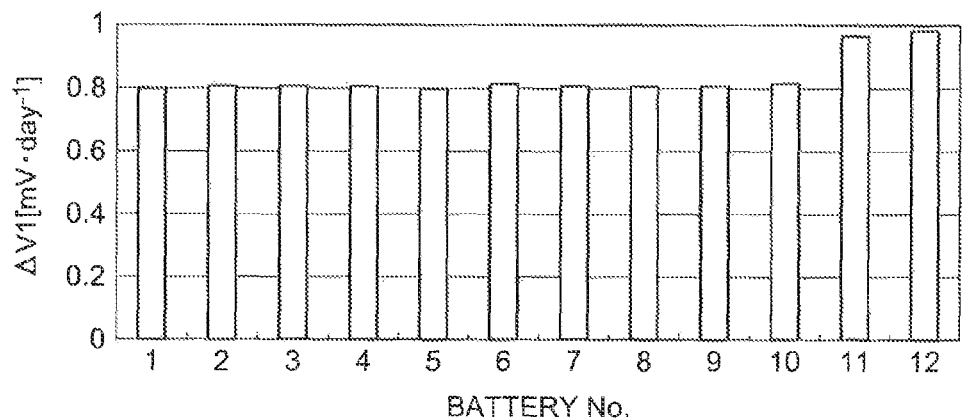
FIG. 3 is a graph illustrating a first example of measurement of a battery characteristic according to the embodiment of the invention.

Next, the batteries after charging were set in a pressing device 20. At this time, the batteries were set so as not to be in direct contact with each other by disposing a pressure plate 21 between the batteries. Using binding plates 22, a pressing force of 1 MPa was applied to side surfaces 15 of the batteries, and the batteries were bound, That is, a compression force in a direction parallel to a lamination direction of the electrode group 12 was applied to the electrode group 12 via a battery package 11 of each battery. In this binding state, the batteries were left for 24 hours at room temperature. After 24 hours, a voltage $V_1$ of each battery was measured in the binding state. A voltage drop amount $\Delta V1$ (unit: mV·day$^{-1}$) with the passage of time was calculated through the expression "$\Delta V1 = |V_1 - V_0|/1$ day". The results are illustrated in FIG. 3.

Figure 4:
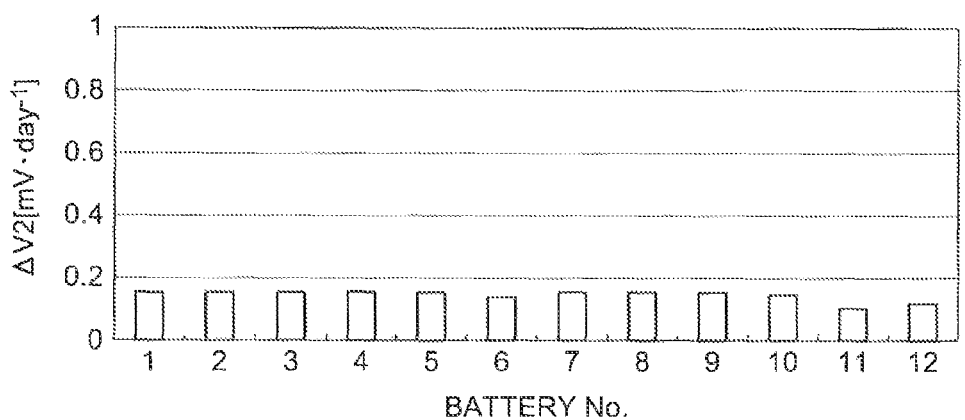
FIG. 4 is a graph illustrating a second example of measurement of a battery characteristic according to the embodiment of the invention.

The second process will be described. Next, the compression force applied to the electrode group was released by releasing the binding of the batteries. After leaving for two hours at room temperature, a voltage $V_2$ of each battery was measured. Thereafter, a voltage $V_3$ of each battery was measured after further leaving for 24 hours at room temperature. A voltage drop amount $\Delta V2$ (unit: mV·day$^{-1}$) with the passage of time was calculated through the expression "$\Delta V2 = |V_3 - V_2|/1$ day". The results are illustrated in FIG. 4.

A comparison between a non-defective product and a defective product was performed based on $\Delta V1$ measured in the first process. FIG. 3 is a graph illustrating the measurement results of $\Delta V1$ in the respective batteries. The horizontal axis of this graph indicates battery Nos. As illustrated in FIG. 3, when comparing $\Delta V1$ of Nos. 1 to 10 (non-defective products) and Nos. 11 and 12 (defective products), the defective products had larger $\Delta V1$. That is, it was possible to detect a small short circuit based on $\Delta V1$. The reason for obtaining such a result is thought to be that since the separator was compressed in the first process and the distance between the positive and negative electrodes is thus reduced, a small short circuit occurred via foreign matter in the defective batteries.

As described above, $\Delta V1$ in the defective products was larger than in the non-defective products. However, the difference was small and $\Delta V1$ of the defective product was kept at a value larger than $\Delta V1$ of the non-defective product by approximately 0.16 (mV·day$^{-1}$). This difference may be buried in a variation in an inspection lot or between inspection lots when assuming that the number of batteries to be inspection targets is increased. In addition, it is thought that it is necessary to set long-term measurement in order to determine a defective product based only on $\Delta V1$.

A comparison between a non-defective product and a defective product was performed based on $\Delta V2$ measured in the second process. FIG. 4 is a graph illustrating the measurement results of $\Delta V2$ in the respective batteries. The horizontal axis of this graph indicates battery Nos. As illustrated in FIG. 4, When comparing $\Delta V2$ of Nos. 1 to 10 (non-defective products) and Nos. 11 and 12 (defective products), the defective products had slightly smaller $\Delta V2$. However, the difference was very small and was approximately 0.04 (mV·day$^{-1}$). Accordingly, it is thought that it is slightly difficult to detect a small short circuit based only on $\Delta V2$.

As a third process, a comparison between a non-defective product and a defective product was performed based on the comparison between $\Delta V1$ and $\Delta V2$. That is, a value ($\Delta V1/\Delta V2$) was calculated by dividing $\Delta V1$ by $\Delta V2$ to compare a non-defective product and a defective product. The results are illustrated in FIG. 5.

Figure 5:
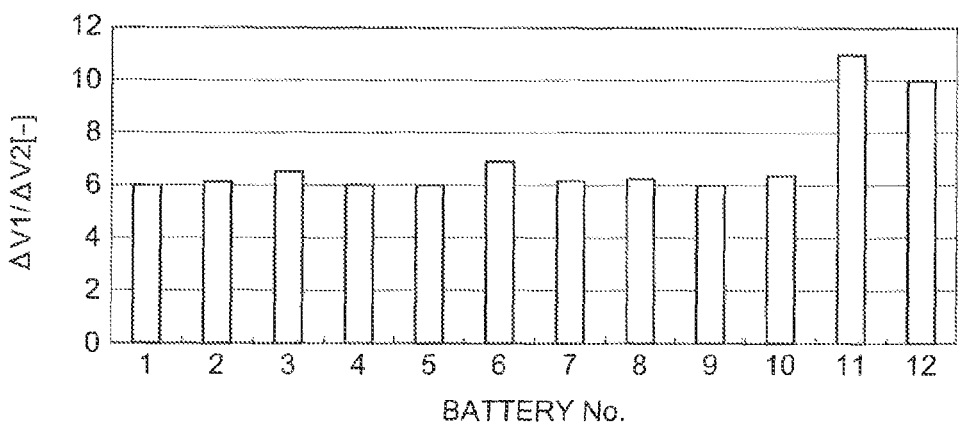
FIG. 5 is a graph illustrating a third example of measurement of a battery characteristic according to the embodiment of the invention.

FIG. 5 is a graph illustrating the calculation results of $\Delta V1/\Delta V2$ in the respective batteries. The horizontal axis of this graph indicates battery Nos. As illustrated in FIG. 5, $\Delta V1/\Delta V2$ in Nos. 11 and 12 (defective products) is as remarkably larger value than in the non-defective products, and the difference is obvious. That is, it was possible to detect a defective product having foreign matter mixed therein with high accuracy. In this example, $\Delta V1/\Delta V2$ in Nos. 11 and 12 (defective products) is 10.0 or larger. Accordingly, in this example, the expression "$\Delta V1/\Delta V2 \geq 10.0$" can be used as a standard for determining a defective product.

Although the embodiments and the examples of the invention have been described as above, the embodiments and the examples in this disclosure are just examples in all respects and must not be considered restrictive. The scope of the invention should be defined by the claims, not by the above description, and it is intended that the invention covers all modifications within the meaning and scope equivalent to those of the claims.

What is claimed is:

1. A manufacturing method for a secondary battery, the secondary battery being configured to include an electrode group in a battery package, the electrode group including a positive electrode, a negative electrode, and a separator, the manufacturing method comprising:

(a) measuring a first voltage drop amount of the secondary battery over a period of time in a state in which a compression force in a direction parallel to a lamination direction of the electrode group is applied to the electrode group via the battery package;

(b) measuring a second voltage drop amount of the secondary battery over a period of time in a state in which the compression force is released; and (c) detecting a small short circuit of the secondary battery by comparing the first voltage drop amount and the second voltage drop amount.

2. The manufacturing method according to claim 1, wherein in the detecting the small short circuit, a determination that the small short circuit occurs is made, when a value obtained by dividing the first voltage drop amount by the second voltage drop amount is larger than a predetermined value.

3. The manufacturing method according to claim 2, wherein when the determination is made, a determination that the secondary battery is a defective product is made.

4. A manufacturing method for a secondary battery, the secondary battery being configured to include an electrode group in a battery package, the electrode group including a positive electrode, a negative electrode, and a separator, a thickness of the separator when the separator is compressed with a pressure of 50 MPa being 70% or less of a thickness of the separator before the compression, the manufacturing method comprising:

(a) measuring a first voltage drop amount of the secondary battery over a period of time in a state in which a compression force in a direction parallel to a lamination direction of the electrode group is applied to the electrode group via the battery package;

(b) measuring a second voltage drop amount of the secondary battery over a period of time in a state in which the compression force is released; and (c) detecting a small short circuit of the secondary battery by comparing the first voltage drop amount and the second voltage drop amount.

* * * * *